(No Model.)

J. H. STEEN.
LAMP CHIMNEY CLEANER.

No. 433,552. Patented Aug. 5, 1890.

WITNESSES:
Ed. I. Sauf
Nat. C. McLean

INVENTOR
James H. Steen
BY Fred W. Bond

ATTORNEY.

UNITED STATES PATENT OFFICE.

JAMES H. STEEN, OF CANTON, OHIO.

LAMP-CHIMNEY CLEANER.

SPECIFICATION forming part of Letters Patent No. 433,552, dated August 5, 1890.

Application filed April 10, 1890. Serial No. 347,372. (No model.)

*To all whom it may concern:*

Be it known that I, JAMES H. STEEN, a citizen of the United States, residing at Canton, in the county of Stark and State of Ohio, have invented certain new and useful Improvements in Lamp-Chimney Cleaners; and I do hereby declare that the following is a full, clear, and exact description of the same, reference being had to the annexed drawings, making a part of this specification, and to the letters of reference marked thereon, in which—

Figure 1:
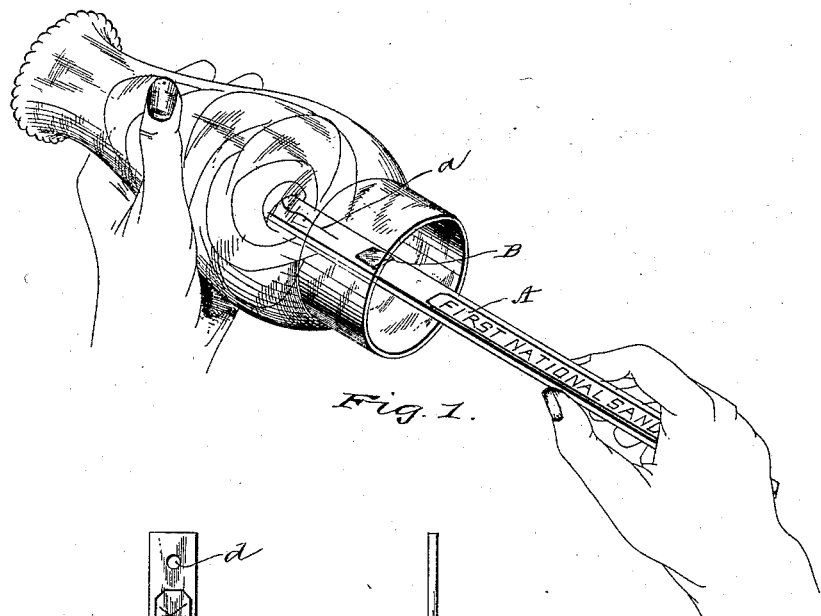
Figure 2:
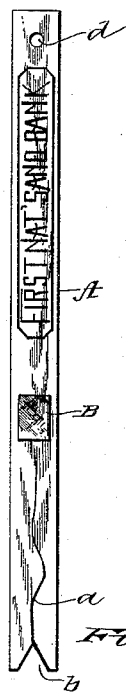
Figure 3:
Figure 4:
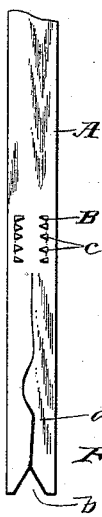

Figure 1 is view showing the cleaner placed within a lamp-chimney. Fig. 2 is a side view showing the cloth or paper designed to clean the chimney removed. Fig. 3 is an edge view showing a part in section. Fig. 4 is a side view looking toward the opposite side from the view shown in Fig. 2.

The present invention has relation to lamp-chimney cleaners; and it consists in the novel arrangement and construction hereinafter described, and particularly pointed out in the claim.

Similar letters of reference indicate corresponding parts in all the figures of the drawings.

In the accompanying drawings, A represents the stick or handle, which is preferably formed of wood and may be of any desired length. One end of the stick or handle A is provided with the curved cut $a$, which cut is formed of sufficient length to receive and hold a piece of cloth or paper, which is placed in the curved cut $a$ and wrapped around the stick or handle A, substantially as illustrated in Fig. 1.

For the purpose of easily entering a piece of cloth or paper into the curved cut $a$ the notch $b$ is provided, which notch acts as a guide to the cut $a$.

For the purpose of preventing the stick or handle from splitting beyond the curved cut $a$ the metal plate B is provided, which plate is provided with the teeth $c$, said teeth being somewhat longer than the thickness of the stick or handle A, so as to cause said teeth to extend through the stick or handle, so as to be clinched upon the opposite side of the stick or handle.

For the purpose of providing a means of advertising, the sides of the stick or handle may be printed upon, as illustrated in Figs. 1 and 2.

The stick or handle A is provided with the aperture $d$, which is for the purpose of hanging said stick or handle to a nail or like object.

It will be understood that by providing the curved cut $a$ the stick or handle A can be moved back and forth in a lamp-chimney without detaching the cloth or paper swab.

Having fully described my invention, what I claim as new, and desire to secure by Letters Patent, is—

The combination of the stick or handle A, provided with the curved cut $a$ and the notch $b$, and the metal plate B, provided with the teeth $c$, substantially as and for the purpose specified.

In testimony that I claim the above I have hereunto subscribed my name in the presence of two witnesses.

JAMES H. STEEN.

Witnesses:
LEVI PENTZ,
F. W. BOND.